United States Patent Office 2,988,156
Patented June 13, 1961

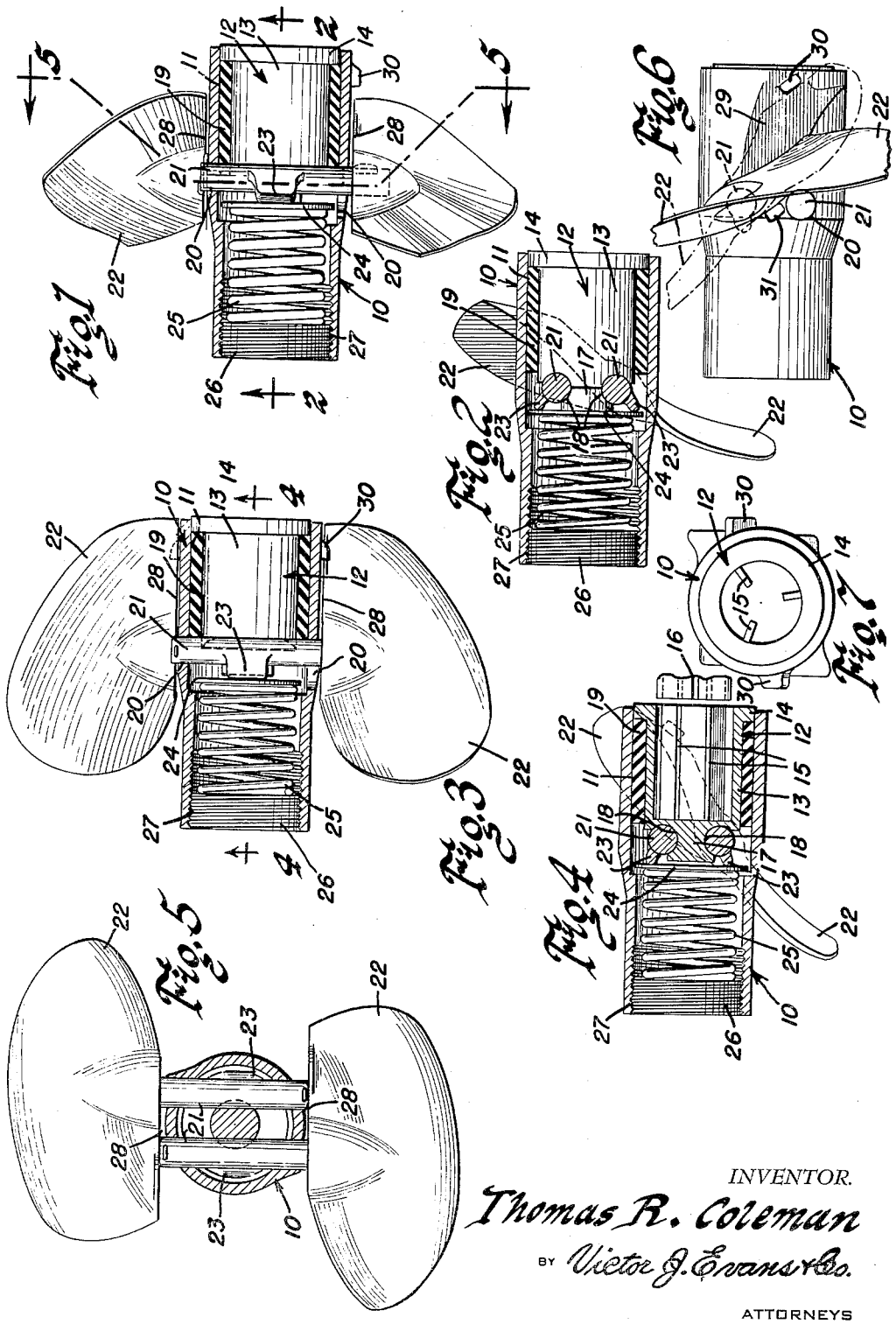

2,988,156
AUTOMATIC VARIABLE PITCH PROPELLER
Thomas R. Coleman, Rte. 5, Yazoo City, Miss.
Filed July 3, 1957, Ser. No. 669,857
2 Claims. (Cl. 170—160.53)

This invention relates to a propeller, and more particularly to a propeller for use with an outboard engine or motor.

The object of the invention is to provide a propeller which is constructed so that the speed thereof will remain constant even though the load varies.

A further object of the invention is to provide an automatic variable pitch propeller which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a longitudinal sectional view taken through the propeller of the present invention.

FIGURE 2 is a sectional view taken on the line 2—2 of FIGURE 1.

FIGURE 3 is a view similar to FIGURE 1 but showing the blades in a different position.

FIGURE 4 is a sectional view taken on the line 4—4 of FIGURE 3.

FIGURE 5 is a sectional view taken on the line 5—5 of FIGURE 1.

FIGURE 6 is an elevational view of the propeller, with parts broken away and in section.

FIGURE 7 is an end elevational view of the device.

Referring in detail to the drawings, the numeral 10 indicates a housing which has a substantially cylindrical shape, and the housing 10 has its ends open, the housing 10 being hollow. One end of the housing 10 is provided with an inner chamber 11 of cylindrical formation, and seated within the chamber 11 is a body member 12. The body member 12 includes a cylindrical portion 13 which has a circular flange 14 extending outwardly from an end thereof, FIGURE 4. The body member 12 is provided with a plurality of inwardly extending ribs 15 which are adapted to engage a splined member 16 that is driven by an outboard engine in the usual manner. The body member 12 further includes a reduced diameter end portion 17 which is provided with curved recesses 18, for a purpose to be later described.

The housing 10 is provided with openings or cutouts 20 through which extend cylindrical pins 21. A bushing 19 which may be made of rubber or the like, is circumposed on the portion 13 of the body member 12, and the bushing 19 abuts the flange 14 to help maintain the parts in their proper assembled relation.

The propeller of the present invention further includes a pair of movable blades 22, and one of the blades 22 in secured to each of the pins 21. Portions of the pins 21 rotatably engage the arcuate seats or recesses 18 in the end portions 17 of the body member 12.

Extending from the pins 21 and secured thereto or formed integral therewith, are lugs 23, and the lugs 23 abut a disk or plate 24. A coil spring 25 is arranged in engagement with the disk 24, and a plug 26 abuts the outer end of the coil spring 25. The plug 26 is arranged in threaded engagement with the threaded portion 27 of the housing 10, so that by rotating the plug 26 to different positions, the compression on the coil spring 25 can be changed as desired.

The inner portions of the blades 22 are provided with flat surfaces 28 that are adapted to co-act with bearing surfaces 29 on the outer portion of the housing 10 whereby the blades 22 will be able to freely move so that the pitch thereof can be changed, automatically. Stop members 30 and 31 are formed integral with the outer portion of the housing 10 or secured thereto in order to limit swinging movement of the blades 22.

From the foregoing, it is apparent that there has been provided a propeller for an outboard motor or engine or the like, and wherein the propeller is constructed so that the pitch of the blades 22 will be regulated or varied automatically. In use, with the member 16 being driven by the engine in any suitable manner, it will be seen that with the member 16 projecting into the portion 13 of the body member 12, the ribs 15 of the body member 12 will engage the splined portion 16 so that as the splined portion 16 is rotated by the engine in the usual manner, the body member 12 will also be rotated. The resilient bushing 19 is mounted on the portion 13 of the body member 12, and as the body member 12 turns, the housing 10 will also be rotated. The pair of blades 22 are secured to the outer ends of the pins 21, and the pins 21 extend through openings or cutouts such as the openings 20 in the wall of the housing 10. Thus, as the housing 10 rotates the blades 22 will be turned or rotated so that the boat can be driven along in the usual manner. In FIGURE 1 there is shown one position of the blade 22, and the blade 22 can move from the position shown in FIGURE 1 to the position shown in FIGURE 3 for example and this movement is possible due to the provision of the spring 25 and its associated parts. Thus, the pins 21 which have the blades 22 secured thereto, are rotatably arranged in the curved seats 18 of the body member 12 so that the increasing resistance of the water can cause the blades 22 to change their pitch. As the pins 21 turn in the seats 18, the lugs 23 will move since the lugs 23 are secured to the pins 21. This movement of the lugs 23 will move the disk 24 since the lugs 23 are arranged in engagement with the disk 24. The disk 24 is able to move since it is abutted by the resilient coil spring 25, and the coil spring 25 is held in place by the plug 26. The compression of the coil spring 25 can be changed or regulated by moving the position of the plug 26 in the threaded portion 27 of the housing 10.

It will therefore be seen that there has been provided a constant speed propeller or a governor for an outboard motor, and the propeller includes the spring 25 which serves to normally urge the blades 22 into a low pitch, high r.p.m. position so that the boat has full power on take-off whereby a greater load can be pulled. When the motor builds up power, it out pushes the pressure of the spring 25 so as to change the blades 22 into a different position, whereby more speed is provided. The tension of the spring 25 is adjusted by tightening the plug or nut 26 which regulates the blades 22 of the propeller. The propeller may be used on any size motor. By regulating the compression of the spring 25, the propeller will not let the motor strain, so that the motor can be used more efficiently. For example, when pulling skis with a speed boat and the skier swings to the outside on a turn and stalls the motor down, with the propeller of the present invention, the spring 25 out pushes the tension that the motor has on the blades so as to move the blades. In other words, the propeller of the present invention operates in the same manner as an automatic transmission. The nut or plug 26 can be screwed out or in with a suitable wrench, and the parts can be readily assembled or disassembled. The parts can be made of any suitable material and in different shapes or sizes. The spring 25 pushes against the disk or washer 24 which pushes against the lugs 23 on the pegs or pins 21. If desired, the entire assembly may be made of bronze and a suitable shear pin can be used and such shear pin can be made of any suitable material. Also, a suitable slip clutch can be used where desired.

The pitch of the blades is adjusted automatically so that a means is provided for compensating for different loads on the engine or motor.

Each pair of propeller blades are so constructed that they have greater area or pitch in the leading portion of the blade forward of pin 21 than the area or pitch to the rear of said pin. Thus as more power and speed is applied to the propeller the pitch will automatically tend to increase and thereby govern the speed of the engine and prevent excessive r.p.m.

While I have shown a preferred form of my invention, I reserve all rights to such modifications as properly fall within the scope of the invention as claimed.

I claim:

1. In an automatic variable pitch propeller, a housing of substantially cylindrical shape, said housing being hollow and having its ends open, there being a cylindrical chamber in one end of said housing, a body member including a cylindrical portion projecting into said chamber, a circular flange extending outwardly from the outer end of said body member, a yieldable cylindrical bushing circumposed on said body member, a plurality of longitudinally extending ribs extending inwardly from said body member, said body member further including a reduced diameter inner end portion, there being a pair of spaced apart curved recesses in said body member adjacent the reduced diameter end portion, said housing being provided with a plurality of openings therein, a pair of blades arranged exteriorly of said housing, pins extending from said blades and projecting through the openings in said housing and said pins rotatably engaging the recesses in said body member, lugs extending from said pins, a disk arranged in said housing and engaging said lugs, a plug arranged in threaded engagement with an end of said housing, resilient means interposed between said plug and disk, said resilient means comprising a coil spring.

2. In an automatic variable pitch propeller, a housing of substantially cylindrical shape, said housing being hollow and having its ends open, there being a cylindrical chamber in one end of said housing, a body member including a cylindrical portion projecting into said chamber, a circular flange extending outwardly from the outer end of said body member, a plurality of spaced apart longitudinally extending ribs extending inwardly from said body member, said body member further including a reduced diameter inner end portion, there being a pair of spaced apart curved recesses in said body member adjacent the reduced diameter end portion, said housing being provided with a plurality of openings therein, a pair of blades arranged exteriorly of said housing, pins extending from said blades and projecting through the openings in said housing, said pins rotatably engaging the recesses in said body member, lugs extending from said pins, a disk arranged in said housing and engaging said lugs, a plug arranged in threaded engagement with an end of said housing, resilient means interposed between said plug and disk, said resilient means comprising a coil spring, said plug being adjustable.

References Cited in the file of this patent

UNITED STATES PATENTS

| | | |
|---|---|---|
| 2,005,343 | Kent | June 18, 1935 |
| 2,099,922 | Bellman | Nov. 23, 1937 |
| 2,235,605 | Bugatti | Mar. 18, 1944 |
| 2,638,171 | Foss | May 12, 1953 |

FOREIGN PATENTS

| | | |
|---|---|---|
| 375,285 | Germany | May 11, 1923 |